United States Patent
Mitsutake et al.

(10) Patent No.: US 8,739,636 B2
(45) Date of Patent: Jun. 3, 2014

(54) ELECTROMAGNETIC FLOW METER HAVING A CIRCUIT THAT PROVIDES POSITIVE AND NEGATIVE MAGNETIC EXCITATION ELECTRIC CURRENTS TO A MAGNETIC EXCITATION COIL

(75) Inventors: Ichiro Mitsutake, Tokyo (JP); Masanori Oohira, Tokyo (JP)

(73) Assignee: Azbil Corporation, Tokyo (JP)

( * ) Notice: Subject to any disclaimer, the term of this patent is extended or adjusted under 35 U.S.C. 154(b) by 493 days.

(21) Appl. No.: 13/071,815

(22) Filed: Mar. 25, 2011

(65) Prior Publication Data

US 2011/0239778 A1      Oct. 6, 2011

(30) Foreign Application Priority Data

Mar. 30, 2010   (JP) ................................ 2010-079353

(51) Int. Cl.
  *G01F 1/58*   (2006.01)
(52) U.S. Cl.
  USPC ...................................................... 73/861.12
(58) Field of Classification Search
  None
  See application file for complete search history.

(56) References Cited

U.S. PATENT DOCUMENTS 5,426,984 A    6/1995  Rovner
2002/0145417 A1  10/2002  Brockhaus

FOREIGN PATENT DOCUMENTS

| JP | 3-144314 A | 6/1991 |
| JP | 8210888 | 8/1996 |
| JP | H9-126848 A | 5/1997 |
| JP | 2001-281029 A | 10/2001 |
| JP | 2003028684 A | 1/2003 |
| WO | 01/90704 A2 | 11/2001 |

*Primary Examiner* — Harshad R Patel
(74) *Attorney, Agent, or Firm* — Troutman Sanders LLP

(57) ABSTRACT

With the non-magnetic-excitation period until a specific amount of time elapses from the commencement of the transition from the positive magnetic excitation period to the non-magnetic-excitation period defined as a first period T1 and the non-magnetic-excitation period until a specific amount of time elapses from the commencement of the transition from the negative magnetic excitation period to the non-magnetic-excitation period defined as a second period T2, the sum of a voltage produced at a detecting electrode and a voltage produced at a detecting electrode, at the time of each first period T1 and second period T2, is calculated as a sum of voltages between electrodes, and a fault in an electromagnetic flow meter, such as detection of an empty state, adhesion of an electrically insulating object to an electrode, and so forth, is evaluated based on the sum of voltages between electrodes.

4 Claims, 6 Drawing Sheets

Background Art

Background Art

ELECTROMAGNETIC FLOW METER HAVING A CIRCUIT THAT PROVIDES POSITIVE AND NEGATIVE MAGNETIC EXCITATION ELECTRIC CURRENTS TO A MAGNETIC EXCITATION COIL

CROSS REFERENCE TO RELATED APPLICATIONS

The present application claims priority under 35 U.S.C. §119 to Japanese Patent Application No. 2010-079353, filed Mar. 30, 2010, which is incorporated herein by reference.

FIELD OF TECHNOLOGY

The present invention relates to an electromagnetic flow meter for measuring flow rates of fluids having electrical conductivity in various types of process systems, and, in particular, relates to an electromagnetic flow meter for measuring flow rates of fluids wherein magnetic excitation electric currents are provided alternatingly, in the positive and the negative directions, with non-magnetic-excitation periods interposed therebetween, to a magnetic excitation coil.

BACKGROUND OF THE INVENTION

Conventionally, as this type of electromagnetic flow meter there have been electromagnetic flow meters of a battery-driven type (hereinafter termed a "battery-type electromagnetic flow meter"). Instead of being supplied with a power supply through a commercial power supply, the battery-type electromagnetic flow meter is provided internally with a battery, where not only is the battery used as the power supply to drive the magnetic excitation circuit, but also to drive a flow rate measuring circuit that produces a flow rate measurement signal through a signal electromotive force that is produced between a pair of electrodes that are disposed facing each other within a measuring tube.

FIG. 6 illustrates the main components in a conventional battery-type electromagnetic flow meter (See, for example, Japanese Unexamined Patent Application Publication H9-126848 and Japanese Unexamined Patent Application Publication 2001-281029). In this FIG: 1 is a measuring tube; 2 is a magnetic excitation coil that is disposed with the direction in which the magnetic field is generated being perpendicular to the direction of flow of the fluid that flows within the measuring tube 1; 3 is a magnetic excitation circuit that provides a magnetic excitation electric current Iex (illustrated in FIG. 7) to the magnetic excitation coil 2 alternatingly in the positive direction and the negative direction, with non-magnetic-excitation periods interposed therebetween, provided with a positive magnetic excitation period and a negative magnetic excitation period before and after the non-magnetic-excitation period; 4a and 4b are a pair of detecting electrodes, disposed facing each other within the measuring tube 1, across the direction of flow of the fluid that flows within the measuring tube 1 and perpendicular to the direction of the magnetic field generated by the magnetic excitation coil 2; 5 is a ground electrode; 6 is a flow rate measuring circuit for detecting a signal electromotive force that is produced between the detecting electrodes 4a and 4b, and for outputting, as a flow rate measurement signal, a pulse signal with a duty ratio with a frequency that varies in accordance with the flow rate of the fluid that flows within the measuring tube 1, based on the detected signal electromotive force; and 7 is an internal battery. A power supply voltage VB is supplied from the internal battery 7 to the magnetic excitation circuit 3 and the flow rate measuring circuit 6.

In the battery-type electromagnetic flow meter, the magnetic excitation circuit 3 is provided with a magnetic excitation electric current direction switching circuit 3-1, a magnetic excitation electric current value adjusting circuit 3-2, and the like. The magnetic excitation electric current direction switching circuit 3-1 receives instructions from the flow rate measuring circuit 6 to switch the direction of the magnetic excitation electric current Iex to the magnetic excitation coil 2 alternatingly to the positive direction and the negative direction, with non-magnetic-excitation periods interposed therebetween. The magnetic excitation electric current value adjusting circuit 3-2 receives instructions from the flow rate measuring circuit 6 to adjust the value of the magnetic excitation electric current Iex to the magnetic excitation coil 2. The flow rate measuring circuit 6 is provided with a CPU 6-1. Instructions are issued from this CPU 6-1 to the magnetic excitation electric current direction switching circuit 3-1 and to the magnetic excitation electric current value adjusting circuit 3-2. Moreover, the flow rate is calculated by the CPU 6-1 based on the signal electromotive force produced between the detecting electrodes 4a and 4b.

In this battery-type electromagnetic flow meter, the operating power supply depends on the internal battery 7, so if the internal battery 7 wears out, it is then necessary to replace with a new battery. Because of this, it is desirable to extend the period with which the batteries are replaced, so when providing the magnetic excitation electric current Iex to the magnetic excitation coil 2, the consumption of the electric power is reduced through the provision of the non-magnetic-excitation periods between the positive magnetic excitation period and the negative magnetic excitation period. This system wherein the non-magnetic-excitation period is provided between the positive magnetic excitation period and the negative magnetic excitation period, that is, this system wherein a positive magnetic excitation period and a negative magnetic excitation period are provided before and after a non-magnetic-excitation period, is known as "tri-state magnetic excitation."

In Japanese Unexamined Patent Application Publication H3-144314 ("JP '314"), for this type of tri-state magnetic excitation electromagnetic flow meter, there are electromagnetic flow meters wherein it is possible to detect a fault that occurs when, for example, the center of the measuring tube empty, or where, for example, something that is electrically insulating becomes adhered to an electrode, where the non-magnetic-excitation period wherein a specific amount of time elapses from the commencement of the transition from the positive magnetic excitation period to the non-magnetic-excitation period is defined as a first period, and the non-magnetic-excitation period wherein a specific amount of time elapses from the commencement of the transition from the negative magnetic excitation period to the non-magnetic-excitation period is defined as a second period, and the voltage difference between the electrodes in the first period is calculated, the voltage difference between the electrodes in the second period is calculated, where a difference between the voltage difference between the electrodes during the first period and the voltage difference between the electrodes during the second period is calculated, and an evaluation that there is a fault is made if this difference exceeds a predetermined reference value.

That is, in the electromagnetic flow meter described in JP '314, if differential noise is produced at the time of switching the magnetic excitation periods and the inside of the measuring tube is empty, then the differential noise that is produced will be large due to the floating capacitance that is formed between the magnetic excitation coil and the electrode. This differential noise is detected as the voltage difference between the electrodes during the first period at the time of the transition from the positive magnetic excitation period to the non-magnetic-excitation period, and detected as the voltage difference between the electrodes in the second period at the time of the transition from the negative magnetic excitation period to the non-magnetic-excitation period, and the fault evaluation is performed based on the voltage differences that are detected between the electrodes. Note that because the polarity of the differential noise that is produced between the electrodes during the first period is opposite of the polarity of the differential noise that is produced between the electrodes during the second period, the differential noise that is produced between the electrodes is detected with twice the magnitude through calculating the difference between the voltage difference between the electrodes in the first period and the voltage difference between the electrodes in the second period.

However, in the tri-state magnetic excitation electromagnetic flow meter disclosed in JP '314, because the fault evaluation is performed based on the voltage differences between the electrodes, that is, in terms of the example illustrated in FIG. 6, because the fault evaluation is performed based on the difference between the voltage produced at the detecting electrode 4a and the voltage produced at the detecting electrode 4b, it is not possible to detect the differential noise except as a small value, and thus there is a problem in that the reliability of the fault evaluation is low.

The present invention is to solve this type of problem, and the object thereof is to provide an electromagnetic flow meter capable of increasing the reliability of the fault evaluation by detecting the differential noise as a large value.

SUMMARY OF THE INVENTION

The present invention, in order to achieve the object set forth above, is an electromagnetic flow meter including a magnetic excitation coil disposed with the direction in which the magnetic field thereof is generated being perpendicular to the direction of flow of a fluid that flows through a measuring tube; a magnetic excitation circuit for providing a magnetic excitation electric current to the magnetic excitation coil alternatingly in a positive direction and in a negative direction, with non-magnetic-excitation periods interposed therebetween, provided with a positive magnetic excitation period and a negative magnetic excitation period before and after the non-magnetic-excitation period; a first and a second electrode, disposed facing each other within the measuring tube across the direction of flow of the fluid flowing in the measuring tube and perpendicular to the direction of the magnetic field generated by the magnetic excitation coil; and a flow rate measuring circuit for outputting, as a flow rate measurement signal, a signal in accordance with the flow rate of the fluid that flows in the measuring tube, based on a signal electromotive force that is produced between the first and the second electrodes, having:

between-electrodes voltage sum calculating means for calculating, as a sum of the voltages between the electrodes, the sum of a voltage produced at the first electrode and the voltage produced at the second electrode, for each first and second period, defining the non-magnetic-excitation period until a specific amount of time elapses from the commencement of the transition from the positive magnetic excitation period to the non-magnetic-excitation period as a first period and defining the non-magnetic-excitation period until a specific amount of time elapses from the commencement of the transition from the negative magnetic excitation period to the non-magnetic-excitation period as a second period; and fault evaluating means for evaluating a fault in the electromagnetic flow meter based on the sum of voltages between the electrodes for each first and second period, calculated by the between-electrodes voltage sum calculating means.

Given this invention, for each first and second period, the sum of the voltage produced at the first electrode and the voltage produced at the second electrode at that time is calculated as the sum of the voltages between the electrodes, and the evaluation of a fault in the electromagnetic flow meter is performed based on the sum of voltages between the electrodes thus calculated for each first and second period. In this case, taking the sum of the voltage produced at the first electrode and the voltage produced at the second electrode adds together the differential noise that is produced at the first electrode and the differential noise that is produced at the second electrode, so that the differential noise is detected as a large value.

Furthermore, when, in the present invention, the sum of the voltage produced at the first electrode and the voltage produced at the second electrode is calculated as the sum of voltages between the electrodes, not only will there be the component that is the differential noise produced through the floating capacitance that is formed between the magnetic excitation coil and the electrode (hereinafter termed the "signal noise"), but the component that is the noise that is produced from the commercial power noise and the 1/f noise that flows at the electrode itself (hereinafter termed "background noise") will also be large. When this type of background noise is a problem, the frequency components wherein there is background noise may be excluded through extracting only specific frequency components from the sum of voltages between the electrodes.

The present invention enables an increase in reliability of fault detection through defining the non-magnetic-excitation period until a specific amount of time elapses from the commencement of the transition from the positive magnetic excitation period to the non-magnetic-excitation period as a first period and defining the non-magnetic-excitation period until a specific amount of time elapses from the commencement of the transition from the negative magnetic excitation period to the non-magnetic-excitation period as a second period, calculating, as the sum of voltages between electrodes for each first and second period, the sum of the voltage produced at the first electrode and the voltage produced at the second electrode at those times, and evaluating the fault based on the sum of voltages between the electrodes calculated for each first and second period, to detect the differential noise as a large value.

DETAILED DESCRIPTION OF THE PRESENT INVENTION

Figure 1:
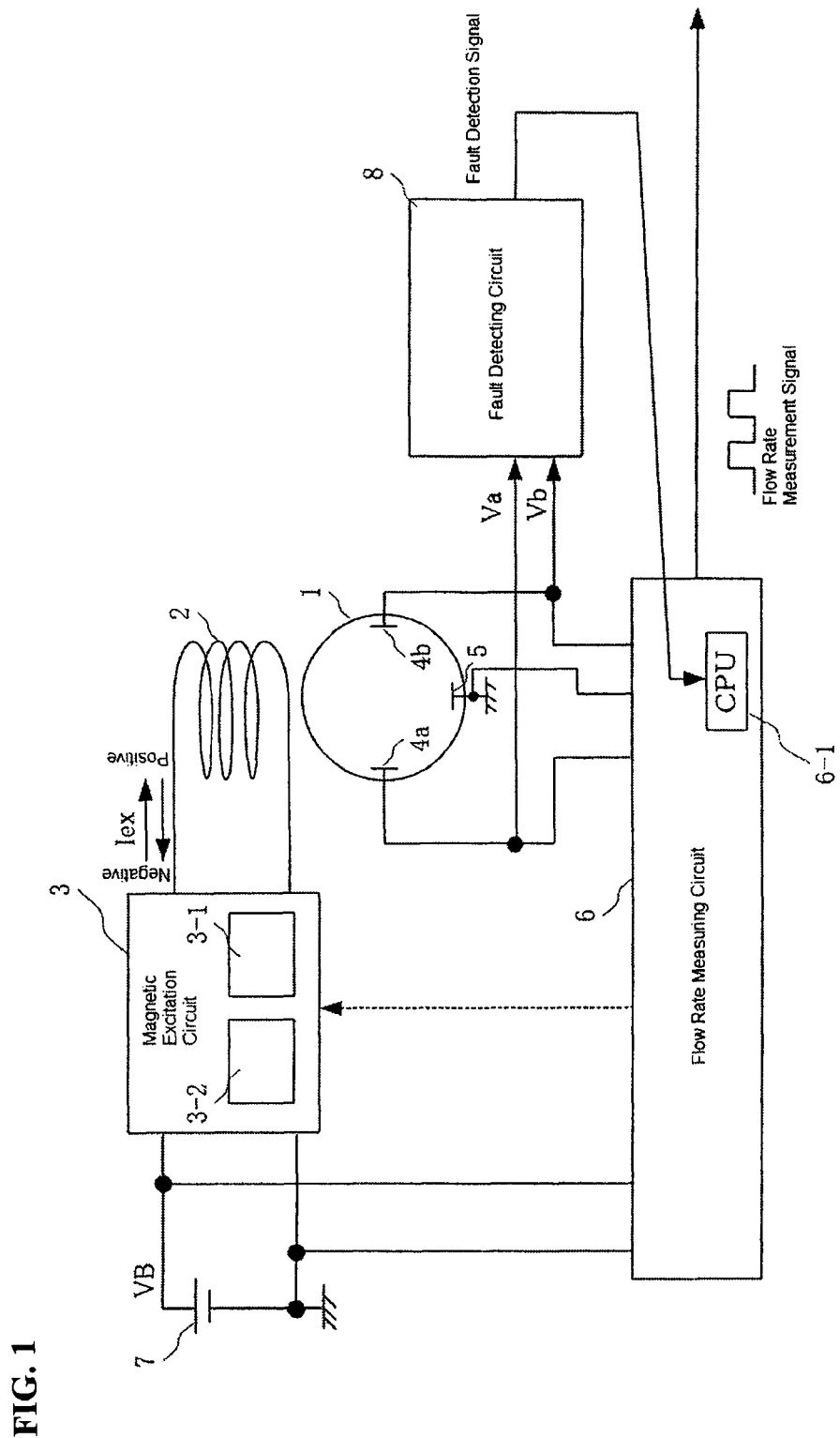
FIG. 1 is a diagram illustrating the main components of an example of an electromagnetic flow meter according to the present invention.
Figure 6:
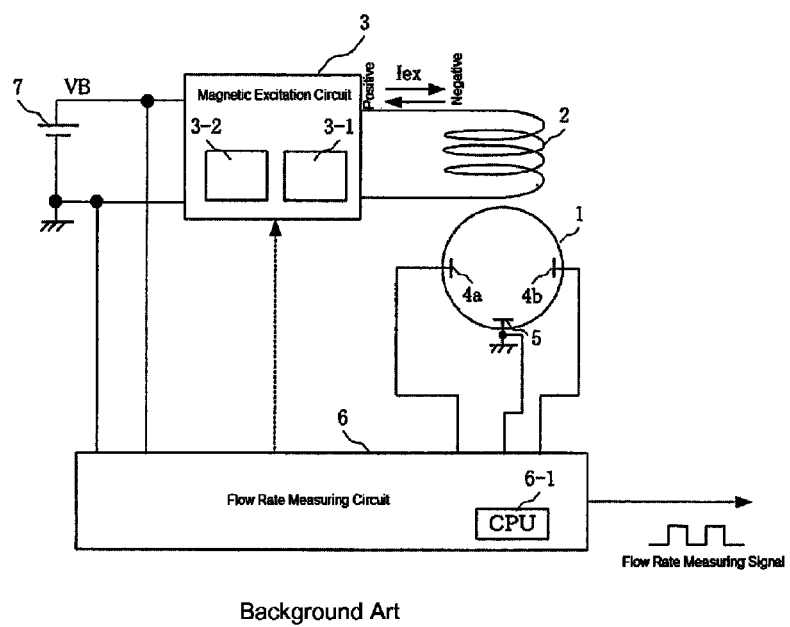
FIG. 6 is a diagram illustrating the main components of a conventional battery-type electromagnetic flow meter.
Figure 7:
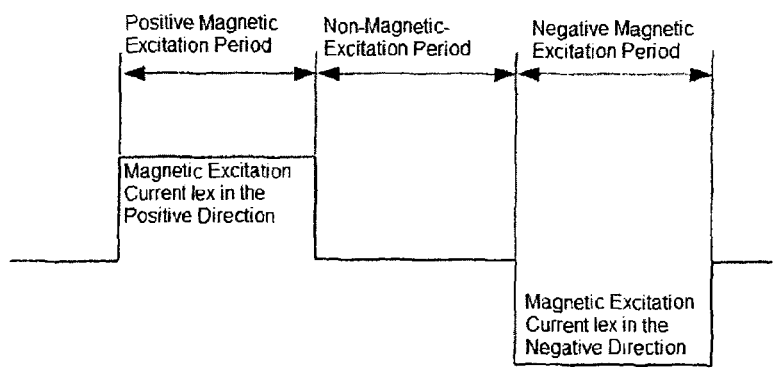
FIG. 7 is a diagram illustrating the magnetic excitation electric current that is provided in the positive direction and in the reverse direction with the non-magnetic-excitation period interposed therebetween.

The present invention will be explained in detail below based on an example. FIG. 1 is a diagram illustrating the main components in one form of an example of an electromagnetic flow meter according to the present invention. In the figure, codes that are identical to those in FIG. 6 indicate structural elements that are identical or similar to structural elements explained in reference to FIG. 6, and explanations thereof are omitted.

In the example, a fault detecting circuit 8 is provided within the electromagnetic flow meter, where a voltage Va that is produced at the detecting electrode 4a and a voltage Vb that is produced at the detecting electrode 4b are applied to the fault detecting circuit 8.

Figure 2:
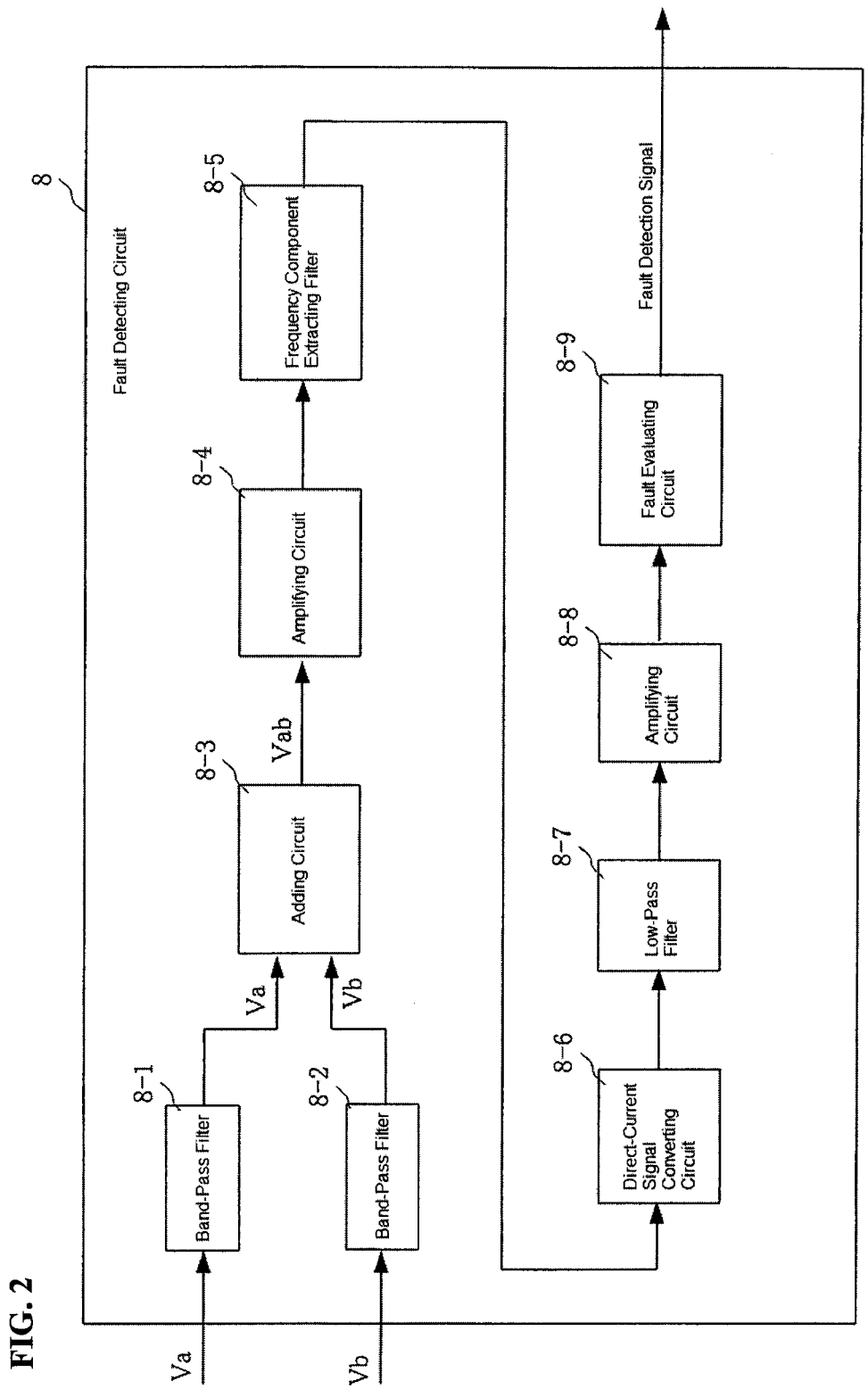
FIG. 2 is a block diagram of a fault detecting circuit in this electromagnetic flow meter.

FIG. 2 shows a block diagram of the fault detecting circuit 8. The fault detecting circuit 8 includes band-pass filters 8-1 and 8-2, an adding circuit 8-3, an amplifying circuit 8-4, a frequency component extracting filter 8-5, a direct-current signal converting circuit 8-6, a low-pass filter 8-7, an amplifying circuit 8-8, and a fault evaluating circuit 8-9.

Figure 3:
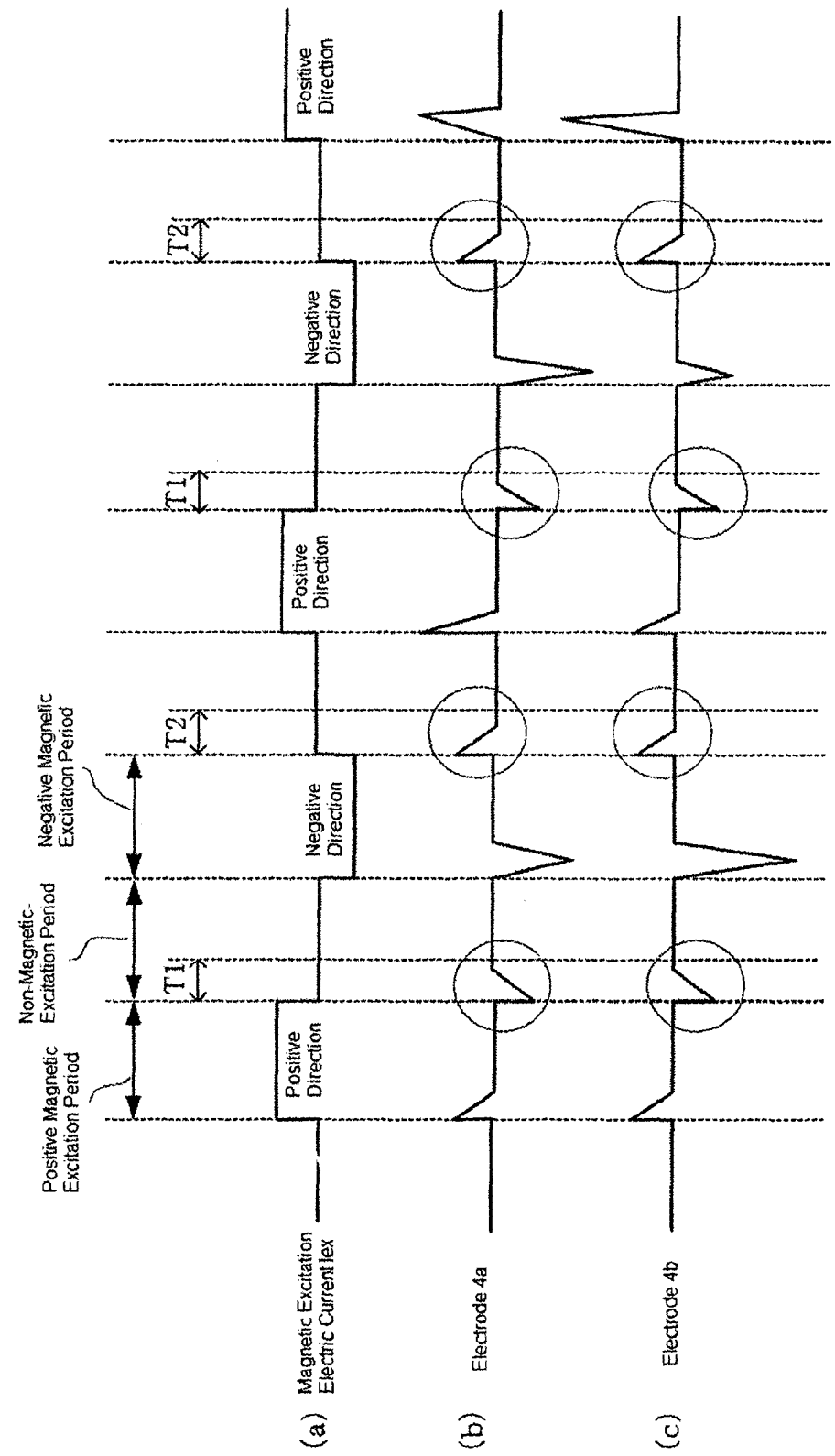
FIG. 3 is a timing chart illustrating an example of the state of production of differential noise in this electromagnetic flow meter.

FIG. 3 illustrates an example of the state of production of differential noise in this electromagnetic flow meter. FIG. 3 (a) is the magnetic excitation electric current Iex. The magnetic excitation electric current Iex is switched alternatingly to the positive direction and to the negative direction, with non-magnetic-excitation periods interposed therebetween, and provided to the magnetic excitation coil 2. Doing so provides a positive magnetic excitation period and a negative magnetic excitation period before and after the non-magnetic-excitation period. FIG. 3 (b) is the differential noise produced at the detecting electrode 4a, and FIG. 3 (c) is the differential noise produced at the detecting electrode 4b, produced when the magnetic excitation period is switched.

The operations of the various circuits within the fault detecting circuit 8 are explained below as the functions thereof are combined. In the fault detecting circuit 8, the band-pass filter 8-1 inputs the voltage Va produced by the detecting electrode 4a, and, with the non-magnetic-excitation period until a specific amount of time elapses from the commencement of the transition from the positive magnetic excitation period to the non-magnetic-excitation period defined as a first period T1 and the non-magnetic-excitation period until a specific amount of time elapses from the commencement of the transition from the negative magnetic excitation period to the non-magnetic-excitation period defined as a second period T2, passes the input voltage Va during the first period T1 and the second period T2, and sends it to the next stage, the adding circuit 8-3.

The band-pass filter 8-2 inputs the voltage Vb produced by the detecting electrode 4b, and, with the non-magnetic-excitation period until a specific amount of time elapses from the commencement of the transition from the positive magnetic excitation period to the non-magnetic-excitation period defined as a first period T1 and the non-magnetic-excitation period until a specific amount of time elapses from the commencement of the transition from the negative magnetic excitation period to the non-magnetic-excitation period defined as a second period T2, passes the input voltage Vb during the first period T1 and the second period T2, and sends it to the next stage, the adding circuit 8-3.

The adding circuit 8-3 adds the input voltage Va from the band-pass filter 8-1 and the input voltage Vb from the band-pass filter 8-2 (Va+Vb), and sends the absolute value thereof (|Va+Vb|) to the amplifying circuit 8-4 as the sum of voltages between the detecting electrodes 4a and 4b (the between-electrodes voltage sum) Vab. The amplifying circuit 8-4 amplifies the between-electrodes voltage sum Vab from the adding circuit 8-3, and sends the result to the frequency component extracting filter 8-5.

The frequency component extracting filter 8-5 inputs the between-electrodes voltage sum Vab from the adding circuit 8-3, which has been amplified by the amplifying circuit 8-4, extracts only a specific frequency component from the between-electrodes voltage sum Vab, and sends it to the direct-current signal converting circuit 8-6.

Extraction of the Specific Frequency Component by the Frequency Component Extracting Filter If, for example, the inside of the measuring tube 1 has become empty, then the differential noise produced at the detecting electrodes 4a and 4b through the floating capacitance produced between the magnetic excitation coil 2 and the detecting electrodes 4a and 4b becomes large. As a result, in the first period T1 both the input voltage Va from the band-pass filter 8-1 and the input voltage Vb from the band-pass filter 8-2 is large in the negative direction, so the between-electrodes voltage sum Vab obtained through adding these input voltages Va and Vb becomes large. Additionally, in the second period T2 both the input voltage Va from the band-pass filter 8-1 and the input voltage Vb from the band-pass filter 8-2 is large in the positive direction, so the between-electrodes voltage sum Vab obtained through adding these input voltages Va and Vb becomes large.

In this case, not only is there the component that is the differential noise produced through the floating capacitance that is formed between the magnetic excitation coil 2 and the detecting electrodes 4a and 4b (hereinafter termed the "signal noise"), but the component that is the noise that is produced from the commercial power noise and the 1/f noise that flows at the electrode itself (hereinafter termed "background noise") is also large.

In the present example, in order to eliminate the frequency component that forms this background noise, only a specific frequency component is extracted from the between-electrodes voltage sum Vab in the frequency component extracting filter 8-5. Specifically, only that frequency component that is greater than 5 Hz and less than 50 Hz is extracted.

Figure 4:
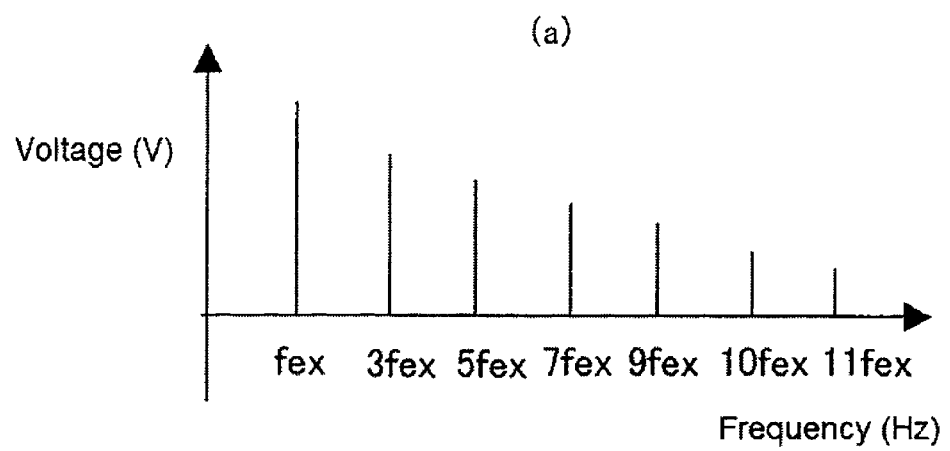
FIG. 4 is a diagram illustrating the results of an analysis of a frequency spectrum of the sum of voltages between the electrodes in the electromagnetic flow meter.
Figure 4:
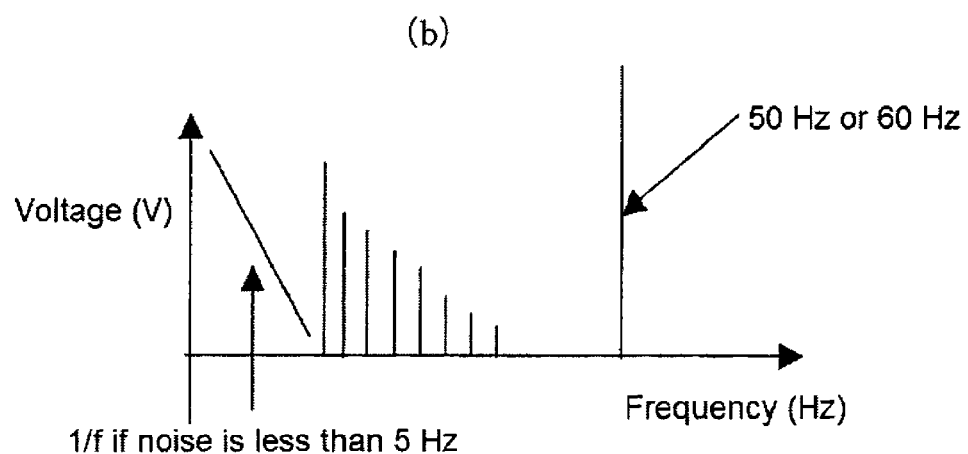

FIG. 4 illustrates the results of an analysis of the frequency spectrum of the between-electrodes voltage sum Vab. In FIG. 4 (a), fex is the magnetic excitation frequency, where the between-electrodes voltage sum Vab includes signal noise of fex, 3 fex, 5 fex, 7 fex, 9 fex, 10 fex, and 11 fex. Note that at the detecting electrodes 4a and 4b, background noise having the frequency components illustrated in FIG. 4 (b) (1/f noise at less than 5 Hz, and 50 Hz or 60 Hz noise) is superimposed when filled with water or when empty. Given this, in the frequency component extracting filter 8-5, extracting only the frequency components that are greater than 5 Hz and less than 50 Hz eliminates the frequency components that are background noise.

The direct-current signal converting circuit 8-6 samples only those portions of the sums of voltages of the specific frequency components, at each first period T1 and second period T2, extracted by the frequency component extracting filter 8-5, wherein, during the period, the sum of voltages is higher than a specific value, and converts into a direct-current signal of a value that is in accordance with a summation of the sampled sums of voltages. In this case, the direct-current signal converting circuit 8-6 is structured as a sample hold circuit.

Note that the direct current signal converting circuit 8-6 may use a peak hold circuit that holds, as a peak value, the maximum value for the sum of voltages during a period, for the sum of voltages of the specific frequency components, for each first period T1 and second period T2 extracted by the frequency component extracting filter 8-5, and converts, into a direct-current signal, a value in accordance with the peak value of the sum of voltages thus held.

The direct-current signal that has been converted by the direct-current signal converting circuit 8-6 passes through the low-pass filter 8-7 to be amplified by the amplifying circuit 8-8, and is applied to the fault evaluating circuit 8-9. The low-pass filter 8-7 passes only a signal of less than a specific frequency, to remove a noise component that is included within the direct-current signal from the direct-current signal converting circuit 8-6.

The fault evaluating circuit 8-9 compares, to a specific reference value, the value of the direct-current signal that has been sent, and if the value of the direct-current signal is in excess of the reference value, outputs a fault detection signal.

In this way, in the present example, the sum of the voltage Va that is produced at the detecting electrode 4a and the voltage Vb that is produced at the detecting electrode 4b is calculated as the between-electrodes voltage sum Vab and the fault evaluation is performed based on this between-electrodes voltage sum Vab, and thus the differential noise is detected as a large value, enabling an increase in the reliability of the fault evaluation.

Figure 5:
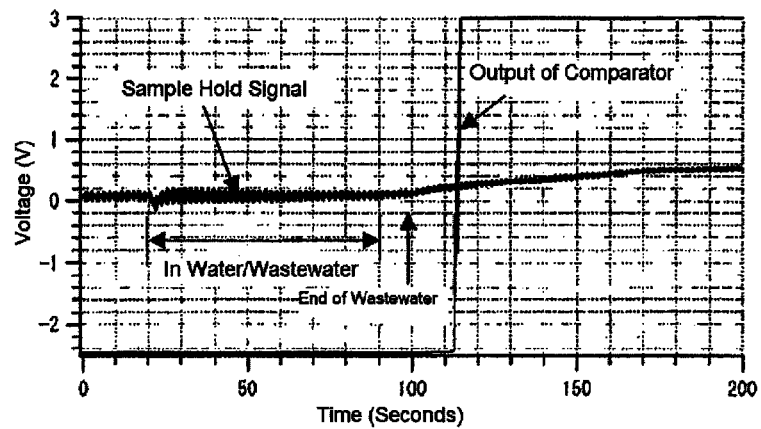
FIG. 5 is a diagram illustrating the relationship between a sample hold signal and a comparator output when the fluid within the measuring tube in this electromagnetic flow meter has gone from being filled with wastewater to being empty.

FIG. 5 illustrates an example of the relationship between the direct-current signal (the sample hold signal) applied to the fault evaluating circuit 8-9 and the fault detection signal (the comparator output) from being filled with the fault evaluating circuit 8-9 when the fluid within the measuring tube 1 goes from wastewater to being empty. In this example, the measuring tube 1 being empty can be detected within about 10 seconds after the end of the wastewater being drained.

Note that while in the example set forth above a frequency component extracting filter 8-5 was provided as a structural element of the fault detecting circuit 8, the provision of the frequency component extracting filter 8-5 is not necessarily imperative, and the structure may also omit the low-pass filter 8-7 and the amplifying circuits 8-4 and 8-8.

Additionally, while in the example set forth above, the band-pass filters 8-1 and 8-2 were inserted prior to the adding circuit 8-3, instead a single band-pass filter may be inserted after the adding circuit 8-3.

Additionally, in the example set forth above, the first period T1 and the second period T2 may be longer than the period over which the generation of signal noise is anticipated, and may be the entire periods until the ends of the non-magnetic-stimulation periods.

Additionally, while in the example set forth above the between-electrodes voltage sum Vab was calculated for each first period T1 and second period T2, and the fault evaluation was performed by comparing, to the reference value, the value of the direct-current signal obtained from the between-electrodes voltage sum Vab calculated for each first period T1 and second period T2, instead the between-electrodes voltage sum Vab calculated during the first period T1 and the between-electrodes voltage sum Vab calculated during the second period T2 may be added together, and the fault evaluation may be performed by comparing, to a reference value, the value of the direct-current signal obtained from this added value of these between-electrodes voltage sums.

Moreover, while in the example set forth above the detection was for faults produced when the inside of the measuring tube 1 became empty or when an insulating object became adhered to the detecting electrode 4a or 4b in a fault detecting circuit 8 that is provided separately from the flow rate measuring circuit 6, the same functions can be obtained through a processing operation in accordance with a program in the CPU 6-1 within the flow rate measuring circuit 6.

The electromagnetic flow meter according to the present invention can be used in a variety of process systems as an electromagnetic flow meter for measuring the flow rate of a fluid having electrical conductivity.

The invention claimed is:

1. A electromagnetic flow meter comprising:
    a magnetic excitation coil disposed with a direction in which a magnetic field thereof is generated being perpendicular to a direction of flow of a fluid that flows through a measuring tube;
    a magnetic excitation circuit that provides a magnetic excitation electric current to the magnetic excitation coil alternatingly in a positive direction and in a negative direction, with non-magnetic-excitation periods interposed therebetween, and provides a positive magnetic excitation period and a negative magnetic excitation period either before and after, or after and before, each of the non-magnetic-excitation periods;
    a first electrode and a second electrode, disposed facing each other within the measuring tube across the direction of flow of the fluid flowing in the measuring tube and perpendicular to the direction of the magnetic field generated by the magnetic excitation coil;
    a flow rate measuring circuit that outputs, as a flow rate measurement signal, a signal in accordance with the flow rate of the fluid that flows in the measuring tube, based on a signal electromotive force that is produced between the first and second electrodes:
    a between-electrodes voltage sum calculator that calculates, as a sum of voltages between the electrodes, the sum of a voltage produced at the first electrode and a voltage produced at the second electrode, for each first and second period, when the non-magnetic-excitation period until a predetermined amount of time elapses from commencement of a transition from the positive magnetic excitation period to the non-magnetic-excitation period is defined as a first period and the non-magnetic-excitation period until a predetermined amount of time elapses from commencement of a transition from the negative magnetic excitation period to the non-magnetic-excitation period is defined as a second period;
    a fault evaluator that evaluates a fault in the electromagnetic flow meter based on the sum of the voltages between the electrodes for each first and second period, calculated by the between-electrodes voltage sum calculator; and
    a frequency component extractor that extracts only a specific frequency component from the sum of the voltages between electrodes, for each first and second period, calculated by the between-electrodes voltage sum calculator, wherein:
    the fault evaluator evaluates a fault in the electromagnetic flow meter based on the sum of the voltages between the electrodes for the specific frequency component, for each first and second period, extracted by the frequency component extractor.

2. The electromagnetic flow meter as set forth in claim 1, comprising:
a direct-current signal converter that samples only those portions of the sums of the voltages of the specific frequency components, at each first period and second period, extracted by the frequency component extractor, wherein, during the period, the sum of voltages is higher than a specific value, and coverts into a direct-current signal of a value that is in accordance with a summation of sampled sums of voltages, wherein:
the fault evaluator compares, to a specific reference value, a value of the direct-current signal converted by the direct-current signal convertor, and output a fault signal if the value of the direct-current signal exceeds the reference value.

3. The electromagnetic flow meter as set forth in claim 2, wherein:
a low-pass filter that passes a signal of less than a specific frequency is provided between the direct-current signal converter and the fault evaluator.

4. The electromagnetic flow meter as set forth in claim 1, comprising:
a direct-current signal converter that holds, as a peak value, a maximum value of the sum of the voltages during the period, at each first period and second period, extracted by the frequency component extractor, and coverts into a direct-current signal of a value that is in accordance with the peak value of the sum of the voltages thus held, wherein:
the fault evaluator compares, to a specific reference value, a value of the direct-current signal converted by the direct-current signal convertor, and outputs a fault signal if the value of the direct-current signal exceeds the reference value.

* * * * *